United States Patent
Cresci et al.

[15] 3,695,710
[45] Oct. 3, 1972

[54] HYDRAULIC LIFT CONTROLS

[72] Inventors: Paul A. Cresci, 180 Ewingville Road, Vineland, N.J. 08638; Thomas H. Paris, Oak and Boulevard, Trenton, N.J. 08360

[22] Filed: Sept. 22, 1970

[21] Appl. No.: 74,326

Related U.S. Application Data

[63] Continuation-in-part of Ser. No. 811,460, March 28, 1969, abandoned.

[52] U.S. Cl. .................. 298/22 R, 60/DIG. 2, 74/11, 180/53, 180/77, 192/3.62, 298/22 C, 417/233
[51] Int. Cl. ............................................. B60p 01/16
[58] Field of Search ........ 180/53, 77; 298/22 R, 22 C; 214/504, 82, 83.3; 60/DIG. 2; 192/3.56, 3.62, .52; 417/231, 233, 223, 374; 74/11

[56] References Cited

UNITED STATES PATENTS

| | | |
|---|---|---|
| 2,539,589 | 1/1951 | Pacas........................192/3.62 |
| 2,714,435 | 8/1955 | D'Ozouville..............192/3.56 |
| 2,931,305 | 4/1960 | Stratton...............298/22 C X |
| 3,288,238 | 11/1966 | Lindsey....................180/77 R |

*Primary Examiner*—A. Harry Levy
*Attorney*—George A. Degnan

[57] ABSTRACT

A control apparatus for hydraulic lifts of the type associated with elevating mechanism for vehicle bodies or dump trucks. Fluid under pressure is supplied to the hydraulic cylinder only when the gear shift lever of the transmission is in neutral position and the brakes of the vehicle have been applied. An electric clutch is interposed between the transmission power take-off and the pump which supplies fluid to the lift cylinder and this clutch is actuated only when the gear shift lever is in neutral position.

7 Claims, 2 Drawing Figures

PATENTED OCT 3 1972  3,695,710

INVENTORS
PAUL A. CRESCI,
THOMAS H. PARIS

HYDRAULIC LIFT CONTROLS

This application is a continuation-in-part of application, Ser. No. 811.460, filed Mar. 28, 1969 and since abandoned.

The present invention relates to the supply of fluid under pressure to the hydraulic cylinder of lift mechanism such as that employed in the patent to Cresci, U.S. Pat. No. 2,899,172 or to dump trucks. It is important that during operation of the lift mechanism the vehicle remain stationary. It is therefore one of the objects of the invention that the transmission of power from the vehicle engine to the wheel drive be interrupted by placing the gear shift lever in neutral position.

It is also an object of the invention that fluid under pressure be available for the lift mechanism only when the vehicle brakes have been applied.

It is further object of the invention to interpose an electric clutch between the power take-off from the engine to the pump which supplies fluid under pressure to the lift mechanism, this clutch being electrically energized only when the gear shift lever of the transmission is in neutral position.

Still another object of the invention is to provide electrically actuated valve mechanism to provide communication between the pump and the lift cylinder either to supply fluid to the cylinder for lifting the vehicle body or releasing the fluid from the cylinder for lowering the body.

Other objects will be apparent from the following description of the invention, reference being made to the accompanying drawings in which.

Figures 1, 2:
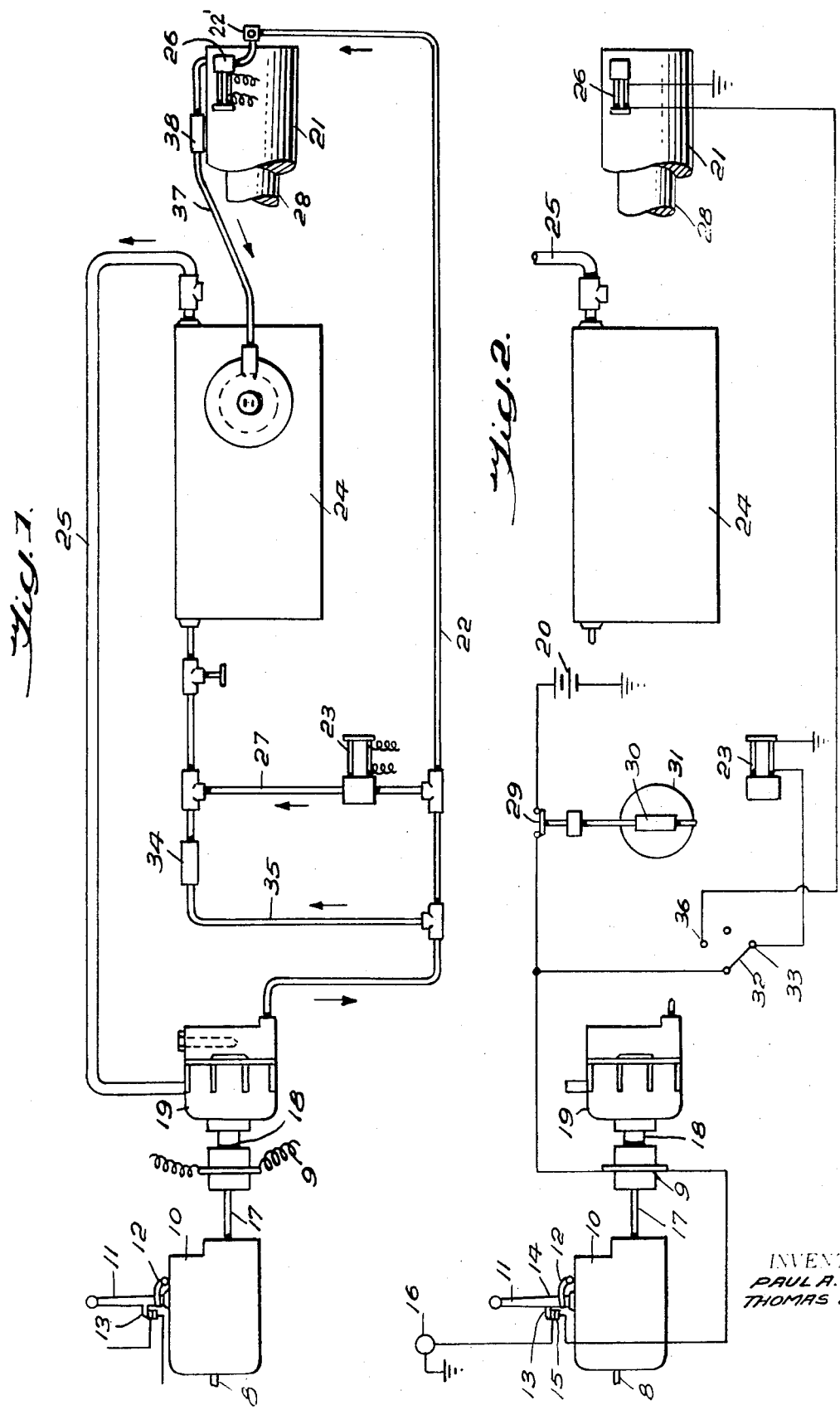
FIG. 1 is a diagrammatic illustration of the fluid supply system.
FIG. 2 is a diagrammatic outline of the electrical system for controlling operation of the lift mechanism.

In the drawings the crank shaft 8 of an engine transmits power to a conventional change speed transmission 10 which is provided with a gear shift lever 11 of the type for changing speed and direction and having a neutral position in which no power is transmitted from the vehicle engine to the wheel drive. Suitable locking means 12 are associated with the shift lever to lock the lever in neutral position. Attached to lever 11 is one contact 13 of switch 14 and supported on the transmission case, is a second contact 15 insulated from the case. Contacts 13 and 15 are engageable with each other only when the shift lever is in neutral position. Contact 13 is supplied with electrical current by placing switch 16 in ignition position.

The transmission includes a power take-off shaft 17 between which and the shaft 18 of rotary pump 19 is interposed an electric clutch 9 which can be energized to connect shafts 17 and 18 when switch 14 is closed by placing the shift lever 11 in neutral position. Battery 20 supplies the necessary electrical energy to effect engagement of the clutch parts.

Referring to FIG. 1 the hydraulic lift cylinder 21 is supplied with fluid under pressure from pump 19 by line 22 provided normally open solenoid valve 23 is closed as will be explained hereinafter. Pump 19 draws fluid from reservoir 24 through line 25. A second solenoid valve 26, which is normally closed, releases fluid from the cylinder when opened. When valve 23 is in open position fluid from pump 19 is by-passed through line 27 to return to reservoir 24, there being insufficient pressure in line 22 at this time to actuate piston 28 in the lift cylinder.

In FIG. 2 it will be seen that switch 29 is in closed position, being responsive to fluid pressure from the hydraulic cylinder 30 which actuates vehicle brake 31. Switch 29 is in series with switch 14 so that in order to energize clutch 9 it is necessary that the brake be applied as well as having the shift lever 11 in neutral position. There is also shown a rotatable switch arm 32 in series with switch 29. Arm 32 is shown in engagement with contact 33 to energize solenoid valve 23, thus closing line 27 to direct fluid through line 22 and check valve 22', to the lift cylinder. Should the pressure in line 22 exceed a preselected limit, i.e., 1,500 p.s.i., pressure responsive valve 34 will open to permit fluid to be by-passed to reservoir 24 through line 35.

When it is desired to lower the vehicle body switch arm 32 is moved into engagement with contact 36 to close the circuit which energizes solenoid valve 26 thus to release fluid from the cylinder 21 and return it to reservoir 24 through pipe 37. A restrictor 38 in the return line reduces flow so that piston 28 returns gradually rather than abruptly to its lowest position. Since solenoid valve 23 is open at this time fluid from the pump is again by-passed through line 27 to the reservoir although the pump is still in operation.

From the foregoing description of the invention it will be apparent that the clutch is deenergized if and when the gear shift lever is in any position other than neutral and the vehicle brake is released.

While the transmission is described as conventional the controls may be associated with standard and automatic transmissions with which power take-off mechanism forms a part.

We claim:

1. In combination with a hydraulic lift mechanism for vehicle bodies including a cylinder and piston, a change speed transmission provided with a power take-off shaft, a gear shift lever for changing engagement of gears in said transmission and having a neutral position, a reservoir for fluid, a pump for supplying fluid under pressure from said reservoir to said cylinder, an electric clutch interposed between said power take-off shaft and said pump, a source of electrical energy for energizing said clutch to connect said shaft to said pump, and a switch controlling the supply of electrical energy to said clutch, said switch being associated with said gear shift lever and being closed only when said gear shift lever is in neutral position.

2. The combination defined in claim 1, in which means are provided for locking said gear shift lever in neutral position.

3. The combination defined in claim 1, in which a by-pass conducts fluid from said pump to said reservoir, said by-pass being interposed between said pump and said cylinder, a normally open solenoid valve in said by-pass, and a switch for energizing said solenoid valve to close said by-pass whereby fluid under pressure is supplied to said cylinder.

4. The combination defined in claim 3, in which a conduit returns fluid from said cylinder to said reservoir, a normally closed solenoid valve in said conduit, the switch for controlling said valve in said by-pass being adjustable to interrupt the supply of electrical energy to said normally open valve and to energize said normally closed valve to open said return conduit.

5. The combination defined in claim 4, in which said return conduit is provided with flow restricting means.

6. The combination defined in claim 1 in which a by-pass conducts fluid from said pump to said reservoir, said by-pass being interposed between said pump and said cylinder, and a pressure responsive valve in said by-pass, said last mentioned valve opening said by-pass when the pressure of fluid in said cylinder exceeds a predetermined limit.

7. The combination defined in claim 1 in which the vehicle is provided with brake means, a second switch in series with the switch for energizing said clutch, said second switch being responsive to brake application pressure and being closed upon application of pressure to said brake means.

* * * * *